BAIN GRIFFITH
INVENTOR

March 28, 1967 B. GRIFFITH 3,310,999
DIFFERENTIAL GEARING AND AXLE ASSEMBLY FOR
AN AUTOMOTIVE VEHICLE DRIVELINE
Filed June 9, 1965 3 Sheets-Sheet 3

BAIN GRIFFITH
INVENTOR
BY John R. Faulkner
Donald J. Harrington
ATTORNEYS

United States Patent Office 3,310,999
Patented Mar. 28, 1967

3,310,999
DIFFERENTIAL GEARING AND AXLE ASSEMBLY FOR AN AUTOMOTIVE VEHICLE DRIVELINE
Bain Griffith, Birmingham, Mich., assignor to Ford Motor Company, Dearborn, Mich., a corporation of Delaware
Filed June 9, 1965, Ser. No. 462,592
9 Claims. (Cl. 74—710)

My invention relates generally to differential and axle assemblies for wheeled vehicles, and more particularly to improvements in a differential gearing assembly for delivering driving torque from an engine powered pinion to each of two axle shafts disposed transversely with respect to the axis of rotation of the pinion.

The improvements of my invention can be applied to vehicle drivelines of known design. Such drivelines comprise a differential and axle housing that is connected to the vehicle frame and body assembly by means of a suitable spring suspension system. A driving pinion is journalled rotatably in the housing. The pinion is driven by an engine driven driveshaft. The connection between the pinion and the driveshaft is in the form of a universal joint.

A differential carrier is journalled rotatably within the differential housing for assemblies of this type. The axis of rotation of the carrier is transverse to the axis of rotation of the pinion. The carrier supports a differential ring gear that drivably engages the pinion.

Disposed within the differential carrier is a pair of differential side gears which in turn are splined or otherwise positively connected to juxtaposed ends of coaxially situated axle shafts, the outward ends of the axle shafts being connected to the vehicle traction wheels. Differential carrier pinions are mounted within the carrier housing in meshing engagement with the differential side gears.

Is is conventional practice to hold the axle shafts in an assembly of this type axially fast by means of thrust bearings and cooperating thrust shoulders located at the outboard ends of the axle shafts. These same bearings provide radial support for the shafts. They are supported by the differential axle shaft housing which is connected to or is formed integrally with the differential carrier housing.

It is an object of my invention to provide a differential and axle shaft construction of the type generally described in the foregoing paragraphs wherein means are included for retaining the axle shafts against axial displacement with respect to the differential housing.

It is an object of my invention to provide axle shaft retainers that form a pair of the differential mechanism itself. This would eliminate the need for providing a complex thrust bearing arrangement on each of the two outboard ends of the axle shafts.

It is another object of my invention to provide a differential and axle shaft assembly for a wheeled vehicle which includes a means for journalling the outward ends of the axle shafts to provide a minimum distance between the center line of each vehicle road wheel and the line of action of the radial loads acting upon the bearing.

It is a further object of my invention to provide a differential and axle assembly which includes means for readily disassembling the axle shaft from the differential assembly to permit repairs.

It is a further object of my invention to provide a differential and axle assembly of the type above set forth and which is characterized by a high degree of interchangeability with differential and axle constructions of known design and which is relatively inexpensive to manufacture and service.

Further objects and features of my invention will become apparent from the following description and from the accompanying drawings, wherein:

FIGURE 4 is a plan view of the clamping element and FIGURE 4A is an end view of the clamping element shown in FIGURE 4;

Figure 1:
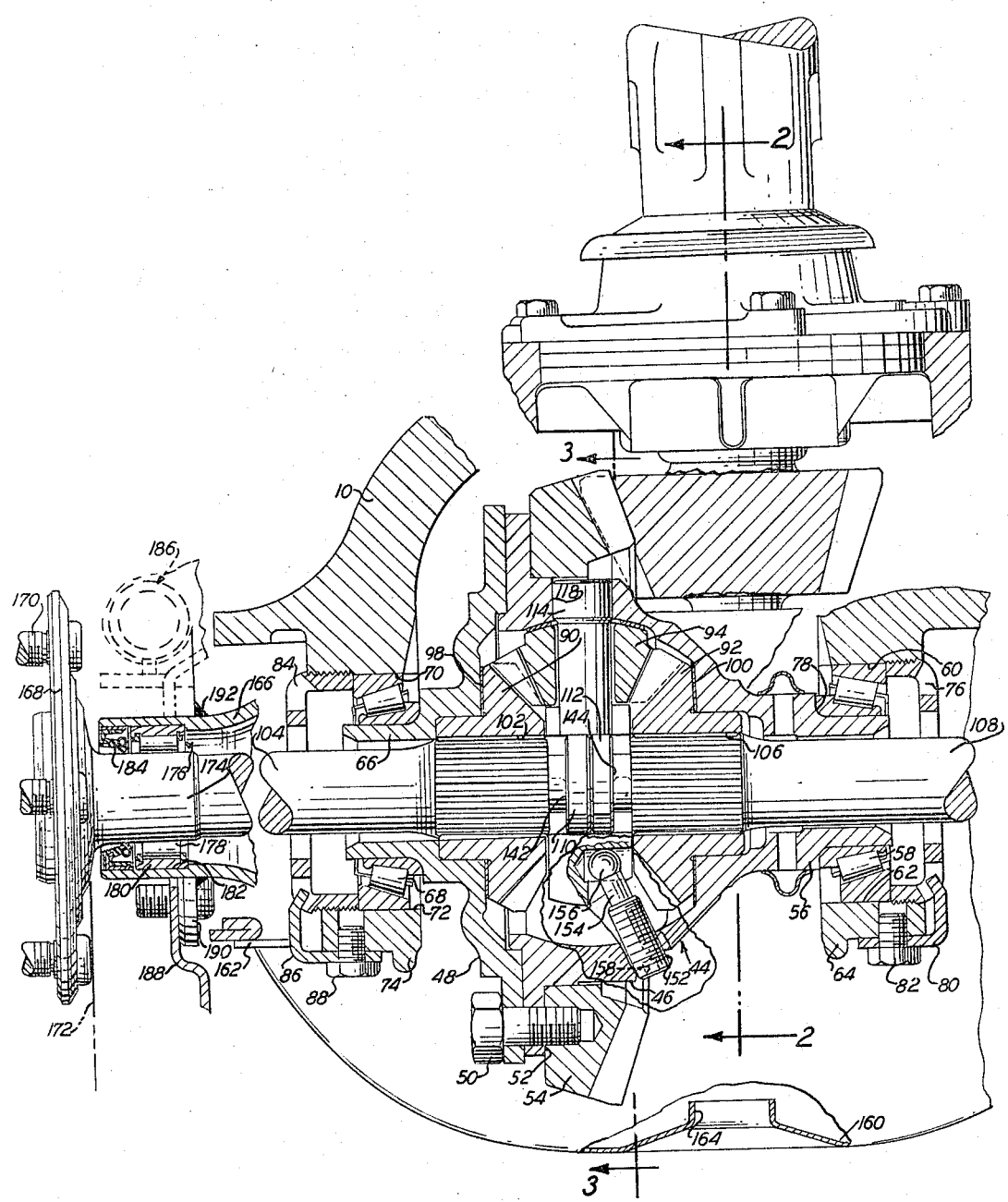
FIGURE 1 shows in partial cross sectional form a differential and axle shaft assembly embodying the improvements of my invention.
Figure 2:
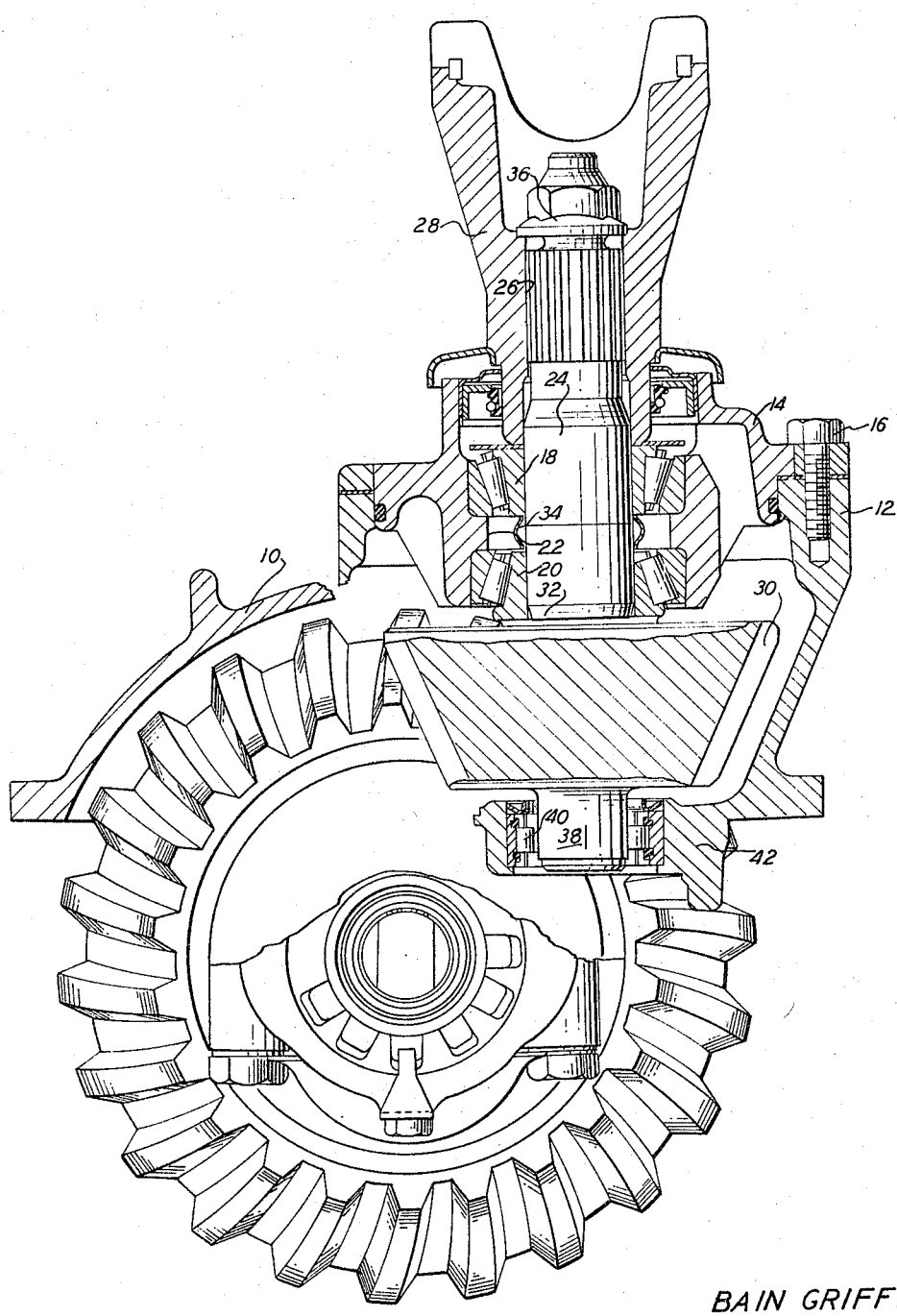
FIGURE 2 is a transverse cross sectional view taken along the plane of section line 2—2 of FIGURE 1.

In FIGURES 1 and 2, numeral 10 designates a differential housing. It includes a collar 12 within which is positioned a pinion bearing retainer 14. This retainer is secured to the collar 12 by bolts 16 and it supports roller bearings 18 and 20. The outer races of these roller bearings engage an annular reaction shoulder 22 formed in the retainer 14. Journalled within the inner race of each bearing is a pinion shaft 24 which is splined at 26 to a universal joint sleeve shaft 28. This forms a part of a universal joint connection with one end of the drive shaft not shown.

The inboard end of shaft 24 carries a differential drive pinion 30. This pinion is formed with a reaction shoulder 32 which engages the inner race of bearing 20. The inner race of bearing 18 is engaged by the end of the sleeve shaft 28. A deformable ring 34 is disposed between the inner races of bearings 18 and 20.

The outboard end of shaft 24 is threaded to accommodate a threaded clamping bolt 36.

The inboard side of the pinion 30 is formed with a pilot shaft 38 which is journalled within pilot bearing 40. This bearing in turn is supported by a bearing support wall 42 which forms a part of the housing 10.

The housing 10 encloses a differential carrier housing 44 which is comprised of two principal parts identified by reference numerals 46 and 48. These are joined together at their peripheries by bolts 50.

Carrier housing part 46 is formed on its periphery with an annular shoulder 52 to which is bolted a differential ring gear 54. The bolts 50 can be used also to establish a bolted connection between ring gear 54 and the carrier housing 44.

A sleeve extension 56 is formed integrally on the differential carrier housing part 46. It is journalled by means of a bearing 58. This bearing in turn is situated within a bearing opening comprising a first semi-circular recess 60 and by the semi-circular interior 62 of a bearing cap 64. This bearing cap in turn can be bolted to the housing 10.

Carrier housing part 48 includes an extension 66 which is journalled by means of a bearing 68. This bearing is received within a bearing opening comprising a semi-circular recess 70 and a semi-circular recess 72 formed in bearing cap 74. This cap 74 is bolted to the housing 10.

The bearing opening for bearing 58 is internally threaded to receive a nut 76 which engages the outer race of bearing 58. The inner race of the bearing 58 engages a reaction shoulder 78 formed on the extension 56. A locking tab 80, which is secured to the bearing cap 64 by a screw 82, engages an opening in the nut 76 to hold the latter rotatably fast after it is assembled with a correct amount of preload.

The bearing opening for bearing 68 also is internally threaded to receive a nut 84. A tab 86 and retainer screw 88 hold the nut 84 in place after assembly.

Figure 3:
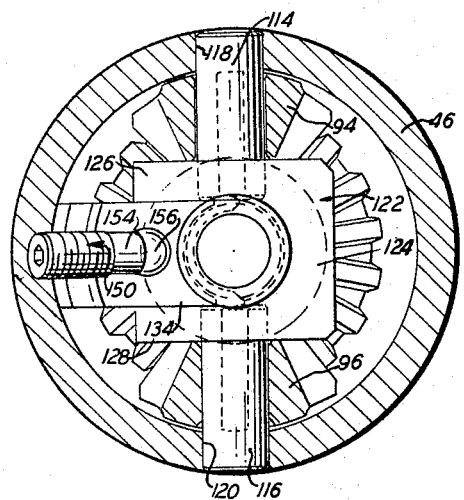
FIGURE 3 is an enlarged view of the carrier portion of the assembly of FIGURES 1 and 2 as seen from the plane of section line 3—3 of FIGURE 1.

As best seen in FIGURES 1 and 3, the differential carrier housing 44 encloses a pair of differential side gears 90 and 92. They are situated in juxtaposed relationship and they engage drivably a pair of differential carrier pinions 94 and 96. Gear 90 is formed with a reaction shoulder 98. A thrust washer is disposed between the shoulder 98 and a cooperating adjacent shoulder formed on the carrier housing portion 48. Side gear 92 also is formed with a reaction shoulder 100. Another thrust washer is disposed between the shoulder 100 and an adjacent annular shoulder formed on the carrier housing portion 46.

The side gear 90 has a hub that is internally splined at 102 to a first axle shaft 104. In a similar fashion side gear 92 is formed with a hub that is internally splined at 106 to a second axle shaft 108. The outboard end of each axle shaft is connected to a separate traction wheel.

The inboard end of the axle shafts 104 and 108 are situated in close proximity as indicated at 110 and 112 respectively.

Pinion 94 is journalled for rotation upon a pinion shaft 114 as indicated in FIGURE 3. The pinion 96 is journalled for rotation upon pinion shaft 116. Shafts 114 and 116 are situated in alignment with their radially outward ends received within openings 118 and 120, respectively, in housing portion 46. A horseshoe shaped differential pin body 122 is received over the ends 110 and 112 of the axle shafts 104 and 108. This body includes a base 124 and two arms 126 and 128 which straddle the inboard ends of the axle shafts.

Figures 4, 4A:
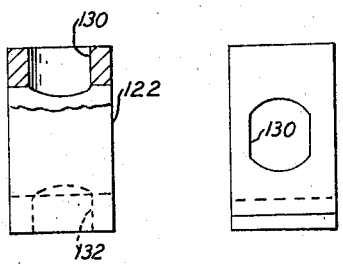
FIGURES 4 and 4A show an axle shaft clamping element used with the drift pin of FIGURES 5, 5A and 5B.

A first radially disposed opening 130 is formed in the arm 126. It receives the radially inward end of the pinion shaft 114 with a forced fit thereby retaining the pinion shaft in place. In a similar fashion, a radial opening 132 is formed in the arm 128. The radially inward end of the pinion shaft 116 is received within the opening 132 with a forced fit. The differential pins may be formed with two oppositely disposed flat sides, and the openings 130 and 132 can be formed with a similar shape as indicated best in FIGURE 4A. Thus the differential pinion shafts are prevented from rotation during operation.

Figure 5:
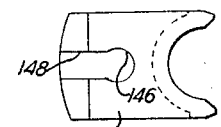
FIGURES 5, 5A and 5B are an end view, a top view and an isometric view, respectively, of a drift pin shown in FIGURES 2 and 3.
Figures 5A, 5B:
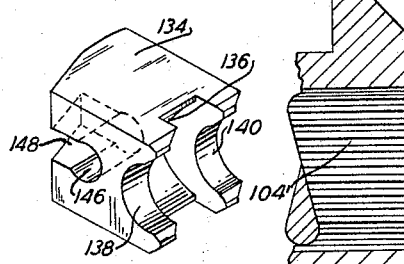

An axle shaft clamping element is illustrated in FIGURES 5, 5A and 5B. It includes a block 134 which is adapted to be slidably received between the legs 126 and 128 of the pin body 122. The radially inward end of the block 134 is formed with a semi-circular recess 136. Situated on either axial side of the recess 136 are recesses 138 and 140. These recesses also are formed with a semi-circular contour and they are arranged with an axis that is common to the axis of the semi-circular recess 136.

The inboard ends of the axle shafts 104 and 108 are formed with annular grooves 142 and 144 respectively. The portions with recesses 138 and 140 of the clamping element are received within the recesses 144 and 142 respectively.

When the clamping element is situated in place, it holds axle shafts 104 and 106 against axial displacement. Element 134 may be slidably fitted within the arms 126 and 128 of the differential pin body 122 as it is moved toward the axis of the axle shafts. The portions with semi-circular recesses 138 and 140 engage the annular grooves 142 and 144 formed in the ends of the axle shafts.

Clamping element 134 includes a cylindrical drilled opening 146 which is arranged in a direction parallel to the direction of the axis of the axle shafts. A radially extending slot 148 extends from the opening 146. The width of the slot 148 is less than the diameter of the opening 146.

An adjustment pin 152 is threadably received in a threaded opening formed in the carrier housing portion 46. It includes a neck portion 154 and a round end 156.

The opening 146 receives the end 156 and the neck 154 extends through the slot 148.

The pin 152 can be formed with an Allen wrench socket 158 or with a screwdriver slot as appropriate. This will permit adjustment of the pin. As the pin 152 is rotated, it will either withdraw or move toward the interior of the differential housing. If it is withdrawn, the clamping element 134 will be withdrawn from locking engagement with the annular grooves 142 and 144 of the axle shafts. This then will permit the removal of the axle shafts by withdrawing them in an axial direction. Splines 102 and 106 will permit the axle shafts to be disengaged from the side gears 90 and 92.

If the pin 152 is turned in a direction that will cause it to advance into the interior of the differential housing, the clamping element 134 will slide inwardly between arms 126 and 128. This is done following assembly of the axle shafts. After the clamping element is engaged, the axle shafts are retained fast and cannot be removed until the pin 152 again is withdrawn.

The differential housing 10 is formed with a rearwardly disposed access opening that is closed by a cover plate 160. This may be bolted at its flanged margin 162 to cooperate with a flange formed on the housing 10. The cover plate 160 is provided with an opening 164 which is situated in alignment with the axis of the pin 152. This will permit entry of a suitable hand tool such as an Allen wrench or a screwdriver from outside of the cover plate 160 thereby permitting adjustment of the pin 152. It is not necessary to disassemble any component of the differential in order to remove the axle shafts.

The opening 164 can be closed by any suitable closure such as a threaded plug.

The axle shaft 104 extends transversely through an axle shaft housing 166. A corresponding housing is provided for shaft 108. Formed on the extreme outboard end of the shaft 104 is a wheel mounting plate 168 which carries a plurality of studs 170. These studs permit the assembly of a road wheel, the center line of which is indicated at 172.

On the inboard side of the plate 168 is an annular bearing shoulder 174. A wheel bearing in the form of a straight roller bearing is shown at 176. It surrounds shoulder 174, the latter acting as an inner race for rollers 178 of the bearing 176. The outer race 180 of the bearing 176 is positioned within a machined bearing opening 182 formed in the end of the housing 166. A fluid seal 184 is located at the outward end of the housing 166.

The bearing arrangement shown in part at 176 permits an increased radial load in comparison to the radial load that can be borne by conventional thrust bearings which are used in environments of this type. It is not necessary for the bearing 176 to accommodate thrust loads, and for this reason its radial loading capacity can be increased.

The wheel brake structure is shown schematically at 186. It is mounted upon a brake drum face plate 188 which in turn is secured at its center to a mounting plate 190. This plate in turn is welded at 192 to the housing 166 at a location adjacent its outboard end.

Figure 6:
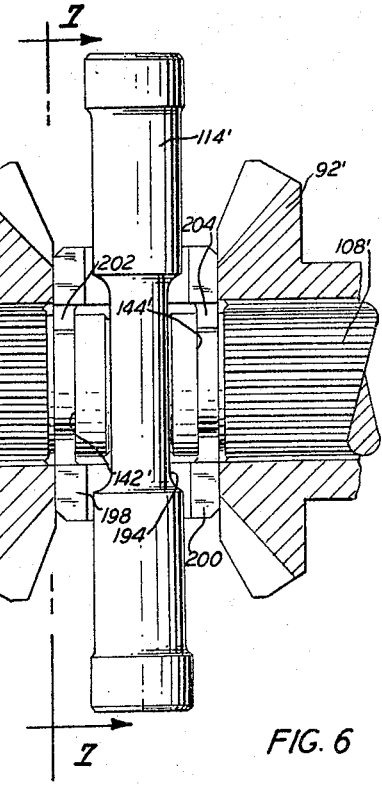
FIGURE 6 is a sub-assembly view of differential side gears, a pinion shaft and an alternate axle shaft retainer.
Figure 7:
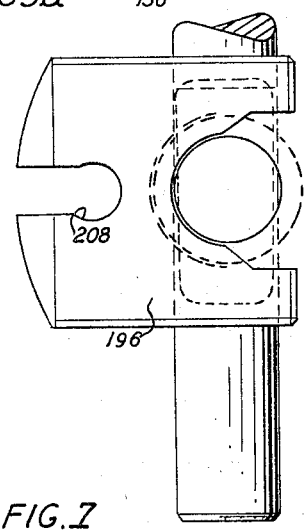
FIGURE 7 is a cross sectional view taken along the plane of section line 7—7 of FIGURE 6.
Figure 8:
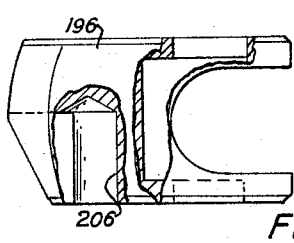
FIGURE 8 is an end view, partly in section, of the retainer of FIGURE 7.

In FIGURES 6, 7 and 8 there is shown an alternate arrangement for locking the ends of the axle shafts. The axle shafts are identified in FIGURE 6 by reference characters 104' and 108'. These are formed, as in the embodiment described previously, with annular grooves 142' and 144'.

In the embodiment of FIGURES 6, 7 and 8, there is only a single differential pinion shaft which is identified by reference character 114'. Unlike the embodiment described previously, the differential pinion shaft 114' extends entirely through the differential housing and is retained within openings that would correspond to openings 118 and 120 in the previous embodiment. A central portion of shaft 114' is formed with a substantially reduced cross section. This is done by providing flats 194 on opposed sides of the shaft 114'. These flats permit the ends of the axle shafts 104′ and 108′ to be moved relatively close to each other. When they are in the position shown in FIGURE 6, the annular grooves 142′ and 144′ are situated on the inboard sides of the side gears which are identified by reference characters 90′ and 92′.

A locking element, which is best seen in FIGURES 7 and 8, includes a body 196 and two bifurcated side portions 198 and 200. The portion 198 is formed with an annular shoulder 202, which is adapted to be received within annular groove 142′. A corresponding annular shoulder 204 is formed on the portion 200. This shoulder is adapted to register with the annular grove 144′.

Body 196 is formed with a transverse drilled opening 206 and with a communicating slot 208. This groove and slot is adapted to accommodate a pin of the type shown in the first embodiment at 152. This pin, as in the previous embodiment, can be threadably received within a threaded opening formed in the carrier housing. It can be adjusted by means of a suitable hand tool to withdraw or advance the locking element after the axle shafts are assembled in the position shown in FIGURE 6. After the locking element is advanced, the axle shafts become locked as in the previous embodiment.

As in the case of the embodiment of FIGURES 1 through 5B, it is possible with a construction of the type shown in FIGURES 6, 7 and 8 to use a simplified, high capacity wheel bearing arrangement of the type shown in FIGURE 1.

Having described a preferred embodiment of my invention, what I claim and desire to secure by U.S. Letters Patent is:

1. In a geared differential assembly, a carrier housing, a ring gear carried by said carrier housing, a driving pinion engageable with said ring gear, a pair of differential side gears in said carrier housing, differential pinions in said carrier housing in meshing engagement with said differential side gears, said side gears being disposed coaxially in juxtaposed relationship, separate driven axle shafts drivably connected to each side gear and extending through said carrier housing, means for journalling said carrier housing for rotation about the axes of said axles shafts, an adjustable locking element within said carrier housing at a location intermediate said side gears, said locking element and the adjacent ends of said axle shafts within said carrier housing having interengageable parts, an adjusting element supported by said carrier housing and extending outwardly therefrom, inward portions of said adjusting element being connected mechanically to said locking element whereby said locking element may be withdrawn out of engagement with the cooperating engageable parts of said axle shafts and adjusted into locking engagement with the same by appropriately adjusting said adjusting element.

2. A differential and axle assembly comprising a differential carrier housing, a ring gear carried by said housing, a driving pinion engageable with said ring gear, said housing being mounted for rotation about an axis that is transverse to the axis of rotation of said pinion, a pair of differential side gears in said housing situated in juxtaposed relationship and adapted for rotation about the axis of said carrier housing, differential pinions carried by said housing in meshing engagement with said side gears, a separate axle shaft connected to and extending outwardly from each of said side gears, adjacent ends of each axle shaft having formed thereon peripheral grooves, a locking element within said housing at a location intermediate said side gears and including locking portions adapted to register with said grooves, and a personally operable adjusting means for adjusting said locking element in a direction transverse to the axis of rotation of said carrier housing for engaging and releasing said axle shafts.

3. In a torque delivery driveline a rotary differential housing mounted for rotation about an axis, a pair of differential side gears in said housing in juxtaposed relationship, said side gears being adapted for rotation about said axis, a separate axle shaft extending from each differential side gear, a releasable connection between each side gear and its associated axle shaft, the adjacent ends of said axle shafts having peripheral grooves formed thereon, a locking element having bifurcated portions adapted to straddle the adjacent ends of said axle shafts including parts that register with said annular grooves, an adjusting element threadably connected to said carrier housing and extending to a location intermediate said side gears, a mechanical connection between said adjusting element and said locking element, said adjusting element being shifted into registry with said axle shafts when said adjusting element is rotated in one direction and being withdrawn in a radially outward direction upon rotation of said adjusting element in the opposite direction.

4. In a geared differential assembly, a carrier housing, a ring gear carried by said carrier housing, a driving pinion engageable with said ring gear, a pair of differential side gears in said carrier housing, differential pinions in said carrier housing in meshing engagement with said differential side gears, said side gears being disposed coaxially in juxtaposed relationship, separate driven axle shafts drivably connected to each side gear and extending through said carrier housing, means for journalling said carrier housing for rotation about the axes of said axle shafts, a pinion shaft retainer in the form of a horseshoe shaped block straddling the adjacent ends of said axle shafts, said horseshoe shaped block having arms, one arm being situated directly adjacent each differential side gear, and an axle shaft locking element being slidably disposed between said arms, one differential pinion shaft being mounted on each of said arms and extending radially outward therefrom, said differential pinions being journalled rotatably upon said pinion shafts.

5. A differential and axle assembly comprising a differential carrier housing, a ring gear carried by said housing, a driving pinion engagable with said ring gear, said housing being adapted for rotation about an axis that is transverse to the axis of rotation of said pinion, a pair of differential side gears in said housing situated in juxtaposed relationship and adapted for rotation about the axis of said carrier housing, differential pinions carried by said housing in meshing engagement with said side gears, a separate axle shaft connected to and extending outwardly from each of said side gears, adjacent ends of each axle shaft having formed thereon peripheral grooves, a locking element within said housing at a location intermediate said side gears and including locking portions adapted to register with said grooves, a personally operable adjusting means for adjusting said locking element in a direction transverse to the axis of rotation of said carrier housing for engaging and releasing said axle shafts, a pinion shaft retainer in the form of a horseshoe shaped block straddling the adjacent ends of said axle shafts, said horseshoe shaped block having arms, one arm being situated directly adjacent each differential side gear, said locking element being slidably disposed between said arms, a differential pinion shaft mounted on each of said arms and extending radially outward therefrom, said differential pinions being journalled rotatably upon said pinion shafts.

6. In a torque delivery driveline a rotary differential housing mounted for rotation about an axis, a pair of differential side gears in said housing in juxtaposed relationship, said side gears being adapted for rotation about said axis, a separate axle shaft extending from each differential side gear, a releasable connection between each side gear and its associated axle shaft, the adjacent ends of said axle shafts having peripheral grooves formed thereon, a locking element having bifurcated portions adapted to straddle the adjacent ends of said axle shafts including parts that register with said annular grooves, an adjusting element threadably connected to said carrier housing and extending to a location intermediate said side gears, a mechanical connection between said adjusting element and said locking element, said adjusting element being adapted to be shifted into registry with said axle shafts when said adjusting element is rotated in one direction and being withdrawn in a radially outward direction upon rotation of said adjusting element in the opposite direction, a pinion shaft retainer in the form of a horseshoe shaped block straddling the adjacent ends of said axle shafts, said horseshoe shaped block having arms, one arm being situated directly adjacent each differential side gear, said locking element being slidably disposed between said arms, a differential pinion shaft mounted on each of said arms and extending radially outward therefrom, said differential pinions being journalled rotatably upon said pinion shafts.

7. In a geared differential assembly, a carrier housing, a ring gear carried by said carrier housing, a driving pinion engageable with said ring gear, a pair of differential side gears in said carrier housing, differential pinions in said carrier housing in meshing engagement with said differential side gears, said side gears being disposed coaxially in juxtaposed relationship, separate driven axle shafts drivably connected to each side gear and extending through said carrier housing, means for journalling said carrier housing for rotation about the axes of said axle shafts, an adjustable locking element having bifurcated portions within said carrier housing at a location intermediate said side gears, said locking element and the adjacent ends of said axle shafts within said carrier housing having interengageable parts, an adjusting element supported by said carrier housing and extending outwardly therefrom, inward portions of said adjusting element being connected mechanically to said locking element whereby said locking element may be withdrawn out of engagement with the cooperating engageable parts of said axle shafts and adjusted into locking engagement with the same by appropriately adjusting said adjusting means, a pinion shaft carried by said carrier housing and extending between the bifurcated portions of said locking element, said differential pinions being journalled rotatably upon said pinion shaft, said pinion shaft being formed with a reduced axial dimension at a location between said bifurcated portions whereby relative rotation of said pinion shaft with respect to said housing is prevented.

8. A differential and axle assembly comprising a differential carrier housing, a ring gear carried by said housing, a driving pinion engageable with said gear, said housing being adapted for rotation about an axis that is transverse to the axis of rotation of said pinion, a pair of differential side gears in said housing situated in juxtaposed relationship and adapted for rotation about the axis of said carrier housing, differential pinions carried by said housing in meshing engagement with said side gears, a separate axle shaft connected to and extending outwardly from each of said side gears, adjacent ends of each axle shaft having formed thereon peripheral grooves, a bifurcated locking element within said housing at a location intermediate said side gears and including locking portions adapted to register with said grooves, a personally operable adjusting means for adjusting said locking element in a directions transverse to the axis of rotation of said carrier housing for engaging and releasing said axle shafts, a pinion shaft carried by said carrier housing and extending between bifurcated portions of said locking element, said differential pinions being journalled rotatably upon said pinion shaft, said pinion shaft being formed with a reduced axial dimension at a location between said bifurcated portions whereby relative rotation of said pinion shaft with respect to said housing is prevented.

9. In a torque delivery driveline a rotary differential housing mounted for rotation about an axis, a pair of differential side gears in said housing in juxtaposed relationship, said side gears being adapted for rotation about said axis, a separate axle shaft extending from each differential side gear, a releasable connection between each side gear and its associated axle shaft, the adjacent ends of said axle shafts having peripheral grooves formed thereon, a locking element having bifurcated portions adapted to straddle the adjacent ends of said axle shafts including parts that register with said annular grooves, an adjusting element threadably connected to said carrier housing and extending to a location intermediate said side gears, a mechanical connection between said adjusting element and said locking element, said adjusting element being adapted to be shifted into registry with said axle shafts when said adjusting element is rotated in one direction and being withdrawn in a radially outward direction upon rotation of said adjusting element in the opposite direction, a pinion shaft carried by said carrier housing and extending between the bifurcated portions of said locking element, said differential pinions being journalled rotatably upon said pinion shaft, said pinion shaft being formed with a reduced axial dimension at a location between said bifurcated portions whereby relative rotation of said pinion shaft with respect to said housing is prevented.

References Cited by the Examiner
UNITED STATES PATENTS

| | | | |
|---|---|---|---|
| 696,704 | 4/1902 | Allen | 74—713 |
| 1,508,832 | 9/1924 | Zimmerschied et al. | 74—713 |
| 2,563,680 | 8/1951 | Hoffman | 74—607 |
| 3,137,181 | 6/1964 | Guilbert | 74—713 |
| 3,198,036 | 8/1965 | Muller | 74—710 |

FOREIGN PATENTS

| | | |
|---|---|---|
| 971,500 | 9/1964 | Great Britain. |

DAVID J. WILLIAMOWSKY, *Primary Examiner.*

J. A. WONG, *Assistant Examiner.*